United States Patent [19]
Gao

[11] Patent Number: 5,717,377
[45] Date of Patent: Feb. 10, 1998

[54] DECELERATION MAGNITUDE DETECTING AND SIGNALING DEVICE

[76] Inventor: Feng Gao, 571 Chestnut St., Lindenhurst, N.Y. 11757

[21] Appl. No.: 730,199

[22] Filed: Oct. 15, 1996

Related U.S. Application Data

[63] Continuation-in-part of Ser. No. 614,666, Mar. 13, 1996, abandoned.

[51] Int. Cl.$^6$ ..................................................... B60Q 1/50
[52] U.S. Cl. .................. 340/467; 340/435; 340/903; 340/904; 340/475
[58] Field of Search ........................ 340/467, 468, 340/435, 436, 901, 902, 903, 904, 906, 936, 942, 479

[56] References Cited

U.S. PATENT DOCUMENTS

| | | | |
|---|---|---|---|
| 3,576,528 | 4/1971 | Hendrickson | 340/71 |
| 4,034,338 | 7/1977 | Bevilacqua | 340/66 |
| 4,726,627 | 2/1988 | Frait et al. | 303/24 R |
| 4,800,377 | 1/1989 | Slade | 340/72 |
| 5,089,805 | 2/1992 | Salsman | 340/467 |
| 5,150,098 | 9/1992 | Rakow | 340/479 |
| 5,165,497 | 11/1992 | Chi | 340/904 |
| 5,481,243 | 1/1996 | Lurie et al. | 340/467 |
| 5,572,449 | 11/1996 | Tang et al. | 364/565 |
| 5,589,827 | 12/1996 | Scurati | 340/903 |

*Primary Examiner*—Thomas Mullen
*Assistant Examiner*—Davetta Woods
*Attorney, Agent, or Firm*—Goldstein & Associates

[57] ABSTRACT

A deceleration magnitude detecting and signaling device for alerting a driver of a following vehicle of the occurrence and magnitude of deceleration of a lead vehicle. A deceleration sensor unit, in circuit between a series of lamp assemblies and a power supply, causes said lamp assemblies to incrementally illuminate in response to increases in deceleration. A signaling unit, affixed to the rear of the lead vehicle, comprises a plurality of light panels which are illuminated by the lamp assemblies in response to increases in deceleration. An infra-red receiver mounted in the following vehicle is capable, upon receiving a signal from an infra-red transmitter mounted upon the lead vehicle, of signaling an engine management override system which is mounted in the following vehicle to automatically decelerate said following vehicle in response to sudden deceleration of the lead vehicle.

4 Claims, 3 Drawing Sheets

DECELERATION MAGNITUDE DETECTING AND SIGNALING DEVICE

This application is a continuation-in-part of application Ser. No. 08/614,666, filed Mar. 13, 1996, abandoned.

BACKGROUND OF THE INVENTION

The invention relates to a deceleration magnitude detecting and signaling device. More particularly, the invention relates to a device which will signal drivers who are following a particular vehicle when such vehicle begins to decelerate, and if necessary, override the engine control system of said following vehicle and cause said following vehicle to decelerate. The signaling to said following vehicle will be accomplished both visually and via an infra-red transmitter Vehicle brake lights have been mandated since the early 1920's for most types of automobiles. Typically, rear mounted lamps having an amber or red lens covering are illuminated upon depression of the vehicle's brake pedal by the operator. Once the operator discontinues depression of the brake pedal, said lights cease to be illuminated.

While the employment of rear brake lights surely results in less automotive accidents occurring, a great number of sudden-deceleration rear-end collisions still take place. In an attempt to decrease the number of rear-end collisions, Congress mandated that auto manufacturers place a third, centrally located brake lamp at the rear of most automobiles to complement the visual notification provided by the traditional brake lamps. While this mandate did serve to decrease the number of overall rear-end collisions, the amount of rear-end collisions occurring is still a continuing problem which can be reduced greatly.

The problem inherent in standard brake lamp systems is that while they do accurately alert drivers behind the subject vehicle that the operator has depressed the brake pedal, they in no way indicate the magnitude of force with which the operator is depressing said brake pedal, nor do they in any way indicate the magnitude of deceleration of the automobile. Furthermore, traditional brake lamp systems also fail to indicate deceleration which occurs as a result of forces external to the braking system, such as the operator of the vehicle lifting his foot off of the accelerator pedal or downshifting the vehicle's transmission into a lower gear. Accordingly, under traditional systems of brake warning lamps, the operator of the following vehicle is not accurately alerted to the magnitude of the lead vehicle's deceleration or to whether the lead vehicle is suddenly decelerating as a result of some occurrence other than depression of the brake pedal.

Various references have been uncovered in the art which attempt to overcome these problems inherent in standard brake lamp systems, but not have succeeded in providing a simple, inexpensive and effective solution. For instance, U.S. Pat. No. 5,376,918 to Vinciguerra et al. discloses a brake lamp warning system which relies on a variable timer rely triggered by release of the acceleration pedal, and thus does not accurately signal brake deceleration magnitude or any type of non-brake deceleration magnitude other than the operator of the vehicle lifting his foot from the accelerator pedal. U.S. Pat. No. 5,172,095 to Scott contemplates a similar time-delay method of alerting following drivers of deceleration of the lead car, but fails to provide any true indication as to non-brake related deceleration, and fails to provide any indication of magnitude of brake related deceleration. U.S. Pat. No 5,381,135 to Blount discloses a similar device activated by release of the accelerator pedal.

U.S. Pat. No. 3,846,748 to Hopwood discloses a device capable of measuring both brake and non-brake deceleration (such as the operator of the vehicle lifting his foot from the accelerator pedal or the operator shifting the vehicle's transmission into a lower gear) but does not provide an indication as to the magnitude of the deceleration encountered. While these types of devices may provide the desired result of supplying true signaling of non-brake related deceleration and both brake and non-brake deceleration magnitude, they are extremely complex and expensive to construct, and subject to typical electrical contact deterioration.

While these above mentioned units may be suitable for the particular purpose employed, or for general use, they would not be as suitable for the purposes of the present invention as disclosed hereafter.

SUMMARY OF THE INVENTION

It is an object of the invention to produce a deceleration magnitude detecting and signaling device.

It is another object of the invention to produce a device which provides a following driver with an early warning of rapid deceleration of vehicles ahead.

It is a further object of the invention to produce a device which is more effective in preventing rear-end collisions than previously known devices and methods.

It is a still further object of the invention to produce a device which is capable of signaling a following driver as to non-brake related deceleration of vehicles ahead (such as transmission gear downshifting) as well as signaling said driver regarding the magnitude of deceleration of the vehicles ahead, and optionally overriding the engine management system of said following vehicle, thus causing said following vehicle to decelerate.

It is yet another object of the invention to provide a device which is simple in design and function and relatively inexpensive to manufacture, having few moving parts susceptible to wear, deterioration and the like.

The invention is a deceleration magnitude detecting and signaling device for alerting a driver of a following vehicle of the occurrence and magnitude of deceleration of a lead vehicle. A deceleration sensor unit, in circuit between a series of lamp assemblies and a power supply, causes said lamp assemblies to incrementally illuminate in response to increases in deceleration. A signaling unit, affixed to the rear of the lead vehicle, comprises a plurality of light panels which are illuminated by the lamp assemblies in response to increases in deceleration. An infra-red receiver mounted in the following vehicle is capable, upon receiving a signal from an infra-red transmitter mounted upon the lead vehicle, of signaling an engine management override system which is mounted in the following vehicle to automatically decelerate said following vehicle in response to sudden deceleration of the lead vehicle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
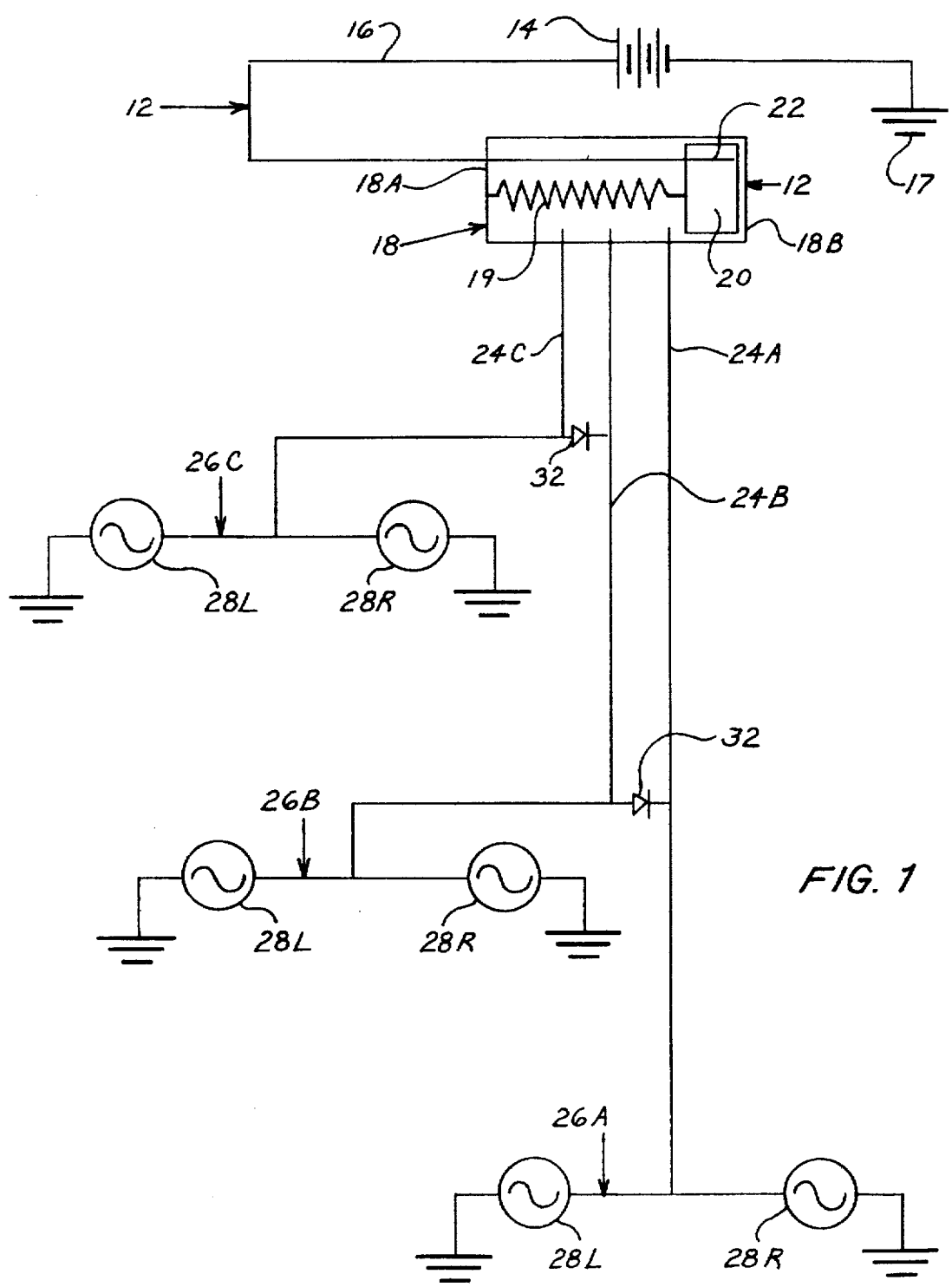
FIG. 1 is a diagrammatic schematic view of a deceleration magnitude detecting and signaling device.

FIG. 1 illustrates a deceleration magnitude detecting and signaling device 10. Deceleration sensing means are shown and comprise a sensor unit 12, which is shown in circuit with a power supply 14 by means of suitable wiring 16. Said power supply 14 is connected in series with the sensor unit 12, and is located between the power supply 14 and a ground connection 17. The sensor unit 12 comprises a cell 18 having opposite ends 18A and 18B. A conductive slide weight 20 is contained within said cell 18 and biased against a spring 19 which is affixed to one of said ends, such that said conductive slide weight 20 may move freely within the cell 18 restrained only by the resistance of the spring 19. A lead electrode 22 penetrates the end 18A of the cell 18, and extends transverse through the length of said cell 18, bringing the slide weight 20 into electrical circuit with the power supply 14. The aperture through which the lead electrode 22 penetrates the cell 18 is electrically insulated so as to prevent any undesired electrical conductivity between the lead electrode 22 and the cell 18 at that point in the event that said cell 18 is comprised of a material having conductive qualities. Other embodiments can contemplate constructing the cell 18 of a material having insulative qualities so as to avoid any potential unwanted electrical conductivity between the lead electrode 22 and the cell 18. It should be noted that while the lead electrode 22 extends almost completely through the cell 18 to the end 18B opposite its penetration, it does not elsewhere contact any region of the cell 18.

Switch electrodes 24 penetrate the length of the cell 18. Shown in this embodiment are three switch electrodes 24A, 24B and 24C. The number of switch electrodes 24 may vary according to the degree to which magnitude of deceleration is desired to be detected. The greater the number of switch electrodes 24 present, the more subtle changes in deceleration can be detected, as will become more apparent below. It should be observed that the switch electrodes 24 are spaced, and the conductive slide weight 20 is sized, such that the conductive slide weight 20 is not capable of contacting more than one switch electrode 24 at any given time.

Each switch electrode 24 is in circuit with a lamp assembly 26. Shown in this embodiment are a first lamp assembly 26A, a second lamp assembly 26B and a third lamp assembly 26C. As seen, the lamp assemblies 26 comprise a plurality of light bulbs 28, further defined as a left light bulb 28L and a right light bulb 28R. Typically, switch electrode 24A is in circuit with the first lamp assembly 26A, while adjacent switch electrode 24B is in circuit with the second lamp assembly 26B, etc.

The cell 18 of the sensor unit 12 is operatively mounted to a lead vehicle 30 such that the cell 18 is parallel to the horizontal axis of the lead vehicle 30. Upon the lead vehicle 30 decelerating, the conductive slide weight 20 is forced, against the weight of the biasing spring 19, from end 18B of the cell 18 closer towards end 18A. As the conductive slide weight 20 contacts switch electrode 24A, it completes a circuit between the lead electrode 22 which is always in contact with the conductive material 20, with the first lamp assembly 26A. Completion of the circuit here between the power supply 14 and the first lamp assembly 26A does not, however, allow current to flow to the second or third lamp assemblies 26B or 26C, even though all lamp assemblies 26 are connected in parallel circuit, due to diodes 32 which impede the flow of current from the first lamp assembly 26A to the second lamp assembly 26B, and from the second lamp assembly 26B to the third lamp assembly 26C, etc. Accordingly, upon the conductive slide weight 20 contacting the switch electrode 24A, only the first lamp assembly 26A (more specifically, the left light bulb 28L and the right light bulb 28R) is caused to be illuminated.

As deceleration increases, the conductive slide weight 20 is forced further along the length of the cell 18, towards end 18A, and is caused to contact switch electrode 24B. As a result, a circuit is completed between the power supply 14 and the second lamp assembly 26B. Current is thus permitted to flow to the second lamp assembly 26B and illuminate the light bulbs 28 located thereat. Furthermore, current is also permitted to flow to the first lamp assembly 26A via the diode 32 which permits the uni-directional flow of current from the second lamp assembly 26B to the first lamp assembly 26A. Thus, upon the conductive slide weight 20 contacting switch electrode 24B, the left light bulbs 28L and the right light bulbs 28R of the first and second lamp assemblies 26A and 26B are illuminated.

The deceleration magnitude signaling device 10 is accordingly configured so that as the conductive slide weight 20 is forced further against the spring 19 within the cell 18 due to deceleration, progressive switch electrodes 24 are contacted and complete the circuit between the lamp assemblies 28 and the power supply 14. The diodes 32 allow the one-way flow of current so that as progressive switch electrodes 24 are contacted by the conductive slide weight 20, the previously illuminated lamp assemblies 28 also receive current, thus permitting more and more light bulbs 28 to be illuminated as deceleration increases.

Figure 2:
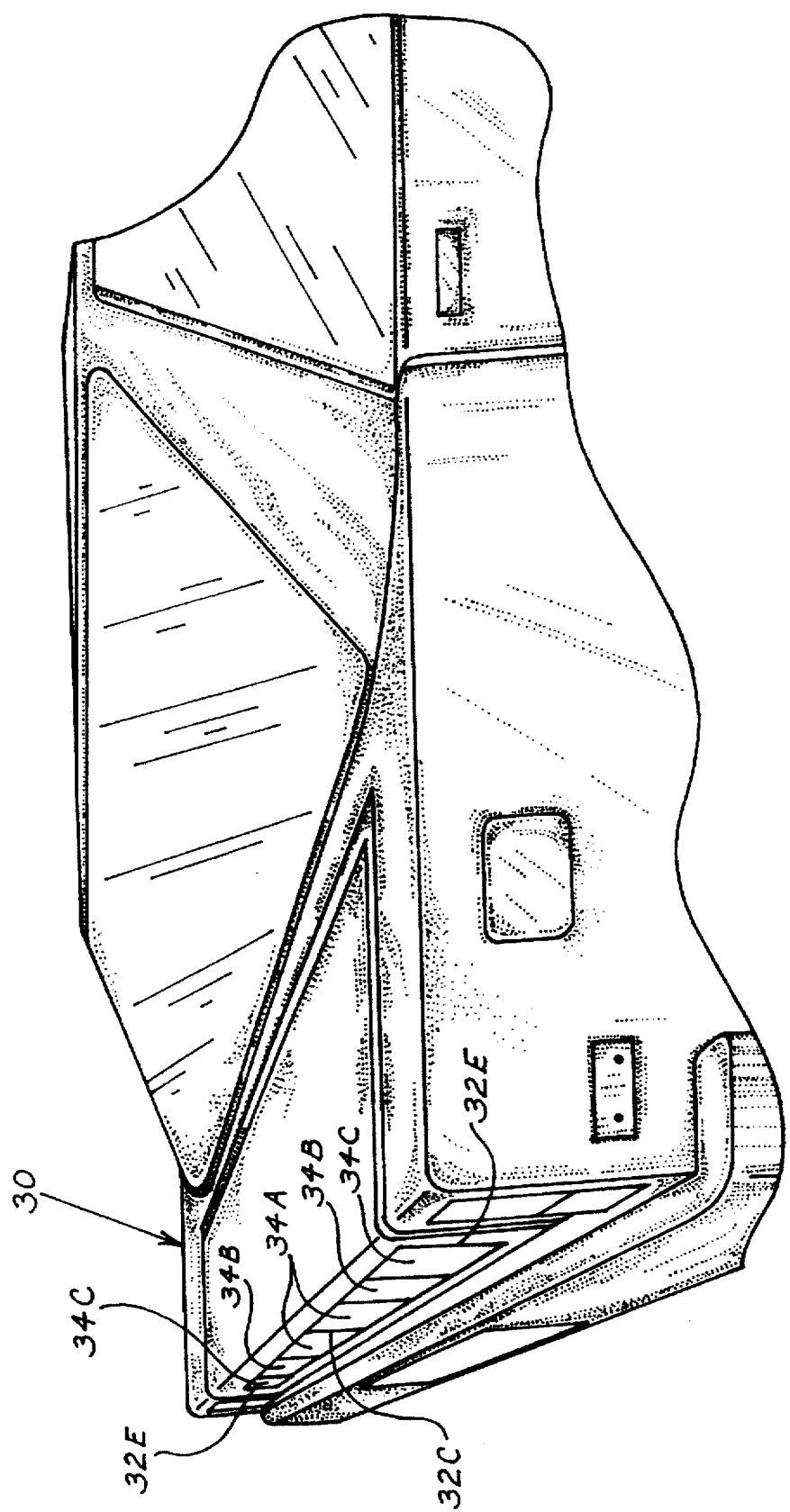
FIG. 2 is a diagrammatic perspective view of an automobile with a signaling unit affixed at the rear thereof.

In FIG. 2, a signaling unit 32, comprising a series of light panels 34 and having a center 32C and two ends 32E, is shown affixed to the rear of the lead vehicle 30. As the vehicle decelerates, the center light panels 34A, which comprise the left and right light bulbs 28L and 28R of the first lamp assembly 26A, will initially be illuminated, thus alerting drivers following the lead vehicle 30 that they should be prepared to stop if necessary. As deceleration increases, the mid light panels 34B, which comprise the left and right light bulbs 28L and 28R of the second lamp assembly 26B, are illuminated. Finally, as the magnitude of deceleration increases even further, the outermost light panels 34C, which comprise the left and right light bulbs 28L and 28R of the third lamp assembly 26C, are illuminated.

Therefore, it can be seen that as deceleration increases, the illumination of the lights panels 34 (via the corresponding light bulbs 28 as outlined above) will begin with the center light panels 34A and expand outwardly, thus alerting the driver of a following vehicle not only to deceleration of the lead vehicle 30, but as to the magnitude of such deceleration. In an alternate embodiment, the order of illumination of the light panels 34 of the signaling unit 32 can be from left to right or right to left. Furthermore, the signaling unit 32 can be oriented vertically so that the light panels 34 may be illuminated from top to bottom or bottom to top in response to increases in magnitude of deceleration. Additionally, the signaling unit 32 can further comprise a grouping of light bulbs 28 located behind a single light panel 34 or plurality of light panels 34, such that, as mentioned above, increases in magnitude of deceleration will cause additional light bulbs 28 (or pairs of light bulbs 28) to become illuminated, thus causing the overall intensity of brightness to increase as deceleration increases.

Figure 3:
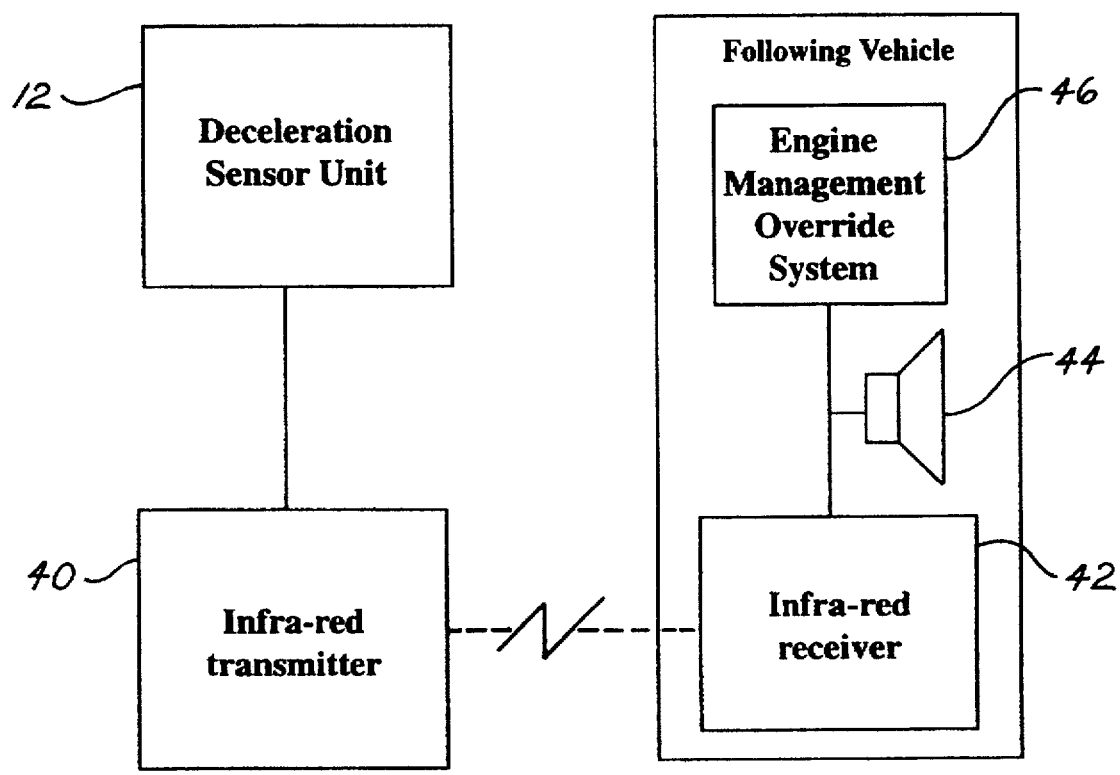
FIG. 3 is a block diagram detailing the relationship between the deceleration sensor unit, infra-red transmitter, infra-red receiver, and engine management override system.

As illustrated in FIG. 3, the sensor unit 12 is in communication with an infra-red transmitted 40, which can be configured to transmit an infra-red signal in response to an indication of a pre-determined level of deceleration from said sensor unit 12. An infra-red receiver 42, located within the following vehicle, is configured to receive infra-red transmissions from the infra-red transmitter 40 (which is optimally installed within the lead vehicle 30). Upon receiving said transmission, the infra-red receiver 42 will activate an audible alert, such as a speaker 44 located within the following vehicle, to signal a driver of the following vehicle that he too should prepare to decelerate. An optional engine management override system 46 which is in communication with the infra-red transmitter can, upon receiving the appropriate signal from said infra-red transmitter 42, automatically decelerate the following vehicle.

What is claimed is:

1. A deceleration magnitude detecting and signaling device for alerting a driver of a following vehicle of the occurrence and magnitude of deceleration of a lead vehicle, comprising:

a) a sensor unit mounted operatively in the lead vehicle, said sensor unit comprising a power source, a cell having opposite ends and a spring affixed to one of said ends, a conductive slide weight contained within said cell and biased against the spring such that said conductive slide weight may move freely within the cell, restrained only by the resistance of the spring, a lead electrode in circuit with the power supply penetrating the cell and extending transverse through the length of said cell and always in electrical contact with the conductive slide weight, a plurality of switch electrodes penetrating the length of the cell, and lamp assemblies which are in circuit with each of said switch electrodes, said lamp assemblies connected in parallel circuit and diodes are situated between said lamp assemblies, said diodes allowing only the unidirectional flow of current from a particular lamp assembly towards the lamp assembly in circuit with the switch electrode previously contacted by the conductive slide weight, such that as the conductive slide weight is forced against the biasing spring by deceleration and contacts progressive switch electrodes, a circuit will be completed and current permitted to flow to those lamp assemblies in circuit with switch assemblies currently and previously contacted, but no current permitted to flow to those lamp assemblies that have not yet been contacted by the conductive slide weight, thus causing incrementally greater numbers of lamp assemblies to receive current as deceleration increases; and b) a signaling unit, mounted at the rear of the lead vehicle, for visually alerting the driver of the following vehicle as to the magnitude of deceleration of the lead vehicle, as detected by the sensor unit.

2. The deceleration magnitude signaling device of claim 1, further comprising:

a) an infra-red transmitter, mounted in the lead vehicle in wired communication with the lamp assemblies, said infra-red transmitter configured to transmit a signal corresponding in intensity to the number of lamp assemblies receiving current from the sensor unit, hence said signal will correspond in intensity to the magnitude of deceleration of the lead vehicle; and b) an infra-red receiver, mounted in the following vehicle, for receiving the signal transmitted by the infra-red transmitter.

3. The deceleration magnitude signaling device of claim 2, wherein the infra-red receiver mounted in the following vehicle is in communication with an engine management override system, said engine management override system capable of automatically decelerating the following vehicle in response to sudden deceleration of the lead vehicle.

4. The deceleration magnitude signaling device of claim 3, wherein the infra-red receiver mounted in the following vehicle is in communication with a speaker which is also mounted within said following vehicle, said speaker capable of providing an audible alert to a driver of the following vehicle, in response to sudden deceleration of the lead vehicle.

* * * * *